(12) United States Patent
Banerjea et al.

(10) Patent No.: US 9,042,825 B2
(45) Date of Patent: May 26, 2015

(54) WIRELESS COEXISTENCE THROUGH ANTENNA SWITCHING

(75) Inventors: Raja Banerjea, Sunnyvale, CA (US); Josselin de la Broise, Palo Alto, CA (US); Harish Ramamurthy, Cupertino, CA (US)

(73) Assignee: MARVELL WORLD TRADE LTD. (BB)

( * ) Notice: Subject to any disclaimer, the term of this patent is extended or adjusted under 35 U.S.C. 154(b) by 230 days.

(21) Appl. No.: 13/615,845

(22) Filed: Sep. 14, 2012

(65) Prior Publication Data

US 2013/0072135 A1    Mar. 21, 2013

Related U.S. Application Data

(60) Provisional application No. 61/535,230, filed on Sep. 15, 2011, provisional application No. 61/576,294, filed on Dec. 15, 2011.

(51) Int. Cl.
*H04B 7/00* (2006.01)
*H04B 1/00* (2006.01)

(52) U.S. Cl.
CPC .............. *H04B 1/0064* (2013.01); *H04B 1/525* (2013.01)

(58) Field of Classification Search
CPC ... H04W 88/06; H04W 84/12; H04W 1/0064; H04B 1/006
USPC .............. 455/73, 78, 83, 550.1, 552.1, 553.1, 455/41.2; 370/329, 338, 334
See application file for complete search history.

(56) References Cited

U.S. PATENT DOCUMENTS

2009/0196210 A1* 8/2009 Desai ............................ 370/311
2010/0316027 A1* 12/2010 Rick et al. ..................... 370/336

* cited by examiner

*Primary Examiner* — Tuan Pham

(57) ABSTRACT

Systems, methods, and other embodiments associated with wireless coexistence through antenna switching are described. According to one embodiment, a method includes selecting one or both of a first transceiver and a second transceiver for connection to an antenna, based, at least in part, on the operating mode of the first transceiver and the second transceiver. The method includes connecting the selected transceiver(s) to the antenna, such that the selected transceiver(s) is enabled to communicate on the antenna and any transceiver(s) not selected is not able to communicate on the antenna.

16 Claims, 5 Drawing Sheets

400

|  |  | WLAN | | | | BT | | |
|---|---|---|---|---|---|---|---|---|
|  |  | Tx | Rx | Rx-Idle | Idle | Tx | Rx | Idle |
| LTE | Tx | (1,1) | (1,1) | (1,1) | (2,0) | (1,1) | (1,1) | (2,0) |
| | Rx | (1,1) | (2,2) or (1,1) | (2,2) or (1,1) | (2,0) | (1,1) | (2,2) or (1,1) | (2,0) |
| | Idle | (0,2) | (0,2) | (0,2) | (1,1) | (0,2) | (0,2) | (1,1) |
| WLAN | Tx |  |  |  |  | (1,1) | (1,1) | (2,0) |
| | Rx |  |  |  |  | (1,1) | (2,2) or (1,1) | (2,0) |
| | Rx-Idle |  |  |  |  | (1,1) | (1,1) or (1,1) | (2,0) |
| | Idle |  |  |  |  | (0,2) | (0,2) | (1,1) |

Figure 4

WIRELESS COEXISTENCE THROUGH ANTENNA SWITCHING

CROSS REFERENCE TO RELATED APPLICATIONS

This patent disclosure claims the benefit of U.S. Provisional Application No. 61/535,230 filed on Sep. 15, 2011 and 61/576,294 filed on Dec. 15, 2011, which are hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Radio receivers are susceptible to desensitization, which can significantly degrade the receiver's operation. Desensitization occurs when a noise signal in the same frequency band "drowns out" an intended signal being transmitted to the receiver. A receiver's automatic gain adjustment will reduce the receiver's gain due to the stronger noise signal and the less powerful intended signal will be lost. Thus, noise signals in adjacent frequency bands are said to "de-sense" the receiver in the receiver's frequency band. Noise signals in the receiver's frequency band may be caused by signals transmitted in nearby bands combining to produce signals in the receiver's band. Many receivers employ filters that are tuned to filter out noise at the ends of the receiver's frequency band to mitigate desensitization.

SUMMARY

In one aspect, this patent disclosure describes an apparatus that, in one embodiment, includes a first transceiver configured to communicate, on an antenna, signals in a first frequency band and a second transceiver configured to communicate, on the antenna, signals in a second frequency band. The first frequency band and the second frequency band are close in frequency relative to one another. The apparatus includes a coexistence arbiter logic configured to select the first transceiver or the second transceiver for connection to the antenna, based, at least in part, on an operating mode of the first transceiver and the second transceiver. The apparatus includes an antenna switch configured to connect the first transceiver or the second transceiver, as selected by the coexistence arbiter logic, to the antenna, such that: i) the selected transceiver is enabled to communicate on the antenna, and ii) a transceiver not selected is not able to communicate on the antenna.

In one aspect, this patent disclosure describes a method that, in one embodiment, includes determining a present operating mode of a first transceiver configured to communicate in a first frequency band on an antenna and determining a present operating mode of a second transceiver configured to communicate in a second frequency band on the antenna. The method includes selecting one of the first transceiver and the second transceiver for connection to the antenna, based, at least in part, on the operating mode of the first transceiver and the second transceiver. The method includes connecting the selected transceiver to the antenna, such that the selected transceiver is enabled to communicate on the antenna and the transceiver not selected is not able to communicate on the antenna.

In one aspect, this patent disclosure describes a device that, in one embodiment, includes a mobile wireless standard (MWS) transceiver configured to communicate signals in an LTE frequency band and a WLAN transceiver configured to communicate signals in an ISM frequency band. The device includes two or more antennas and a coexistence arbiter logic configured to select the MWS transceiver, the WLAN transceiver, or both the MWS transceiver and the WLAN transceiver for connection to one or two of the two or more antennas, based, at least in part, on an operating mode of the MWS transceiver and the WLAN transceiver. The apparatus includes an antenna switch configured to connect the MWS transceiver and/or the WLAN transceiver, as selected by the coexistence arbiter logic, to a selected one or two of the antennas.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 illustrates one embodiment of an apparatus associated with wireless coexistence through antenna switching.

DETAILED DESCRIPTION

Figure 1:
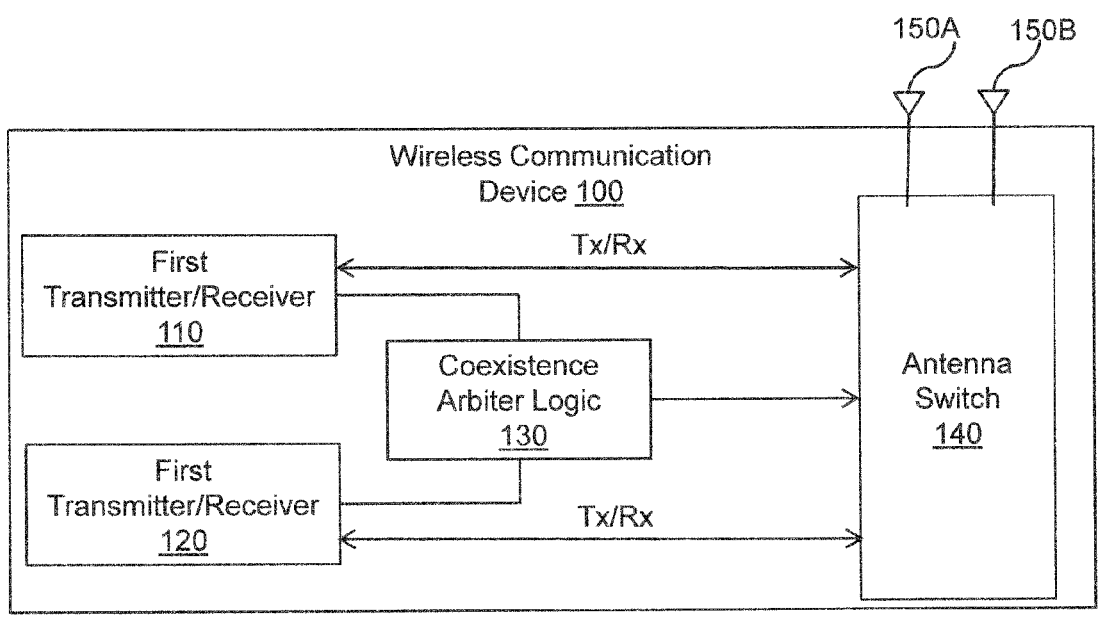
FIG. 1 illustrates one embodiment of an apparatus associated with wireless coexistence through antenna switching.

Many mobile wireless devices include Long Term Evolution (LTE), Wide Local Area Network (WLAN), and/or Bluetooth (BT) transceivers. Due to space and cost constraints of wireless devices the LTE, WLAN, and BT transceivers share one or more antennas. This antenna sharing is possible because LTE, WLAN, and BT protocols all operate in a 2.3-2.5 GHz frequency band. Due to a close proximity in frequency between LTE signals, WLAN signals, and BT signals, in some operating scenarios, mobile wireless devices are transmitting and receiving simultaneously in adjacent or nearly adjacent frequency bands. This makes the LTE, WLAN, and BT receivers susceptible to desensitization.

Described herein are examples of systems, methods, and other embodiments associated with using antenna switching to enable coexistence of multiple transceivers using different communication protocols on a same wireless device. While antenna switching will be described in a context of LTE communication protocols, WLAN communication protocols, and BT communication protocols, antenna switching may be employed to address de-sensing caused by any number of different communication protocols.

With antenna switching, one or more shared antennas on the wireless device are switched so that an antenna is connected to selected transceivers based on the operating condition of the transceivers. The antenna(s) is connected to a transceiver when the transceiver is in an act of transmitting or receiving. In this manner, the transceiver is not processing signals not intended for the transceiver, reducing the de-sensing effects of signals in neighboring frequency bands on the transceiver.

Many modern handheld devices communicate via LTE protocols, WLAN protocols, and/or BT protocols. LTE communications in Time division multiplex (TDM) mode occur in "Band 40" which ranges from 2300-2400 MHz. LTE communications in Frequency Division Duplex (FDD) mode occur in "Band 7" which ranges from 2500-2570 MHz. WLAN and BT transmit and receive in a 2.4 GHz industrial, scientific, and medical (ISM) band, which ranges from 2400 MHz to 2483.5 MHz. Thus, LTE communication occurs in frequency bands adjacent or nearly adjacent to the ISM band on which WLAN/BT communications occur.

In a wireless device having an LTE receiver, a WLAN receiver, and/or a BT receiver, LTE transmissions in Band 40 and Band 7 tend to de-sense the WLAN receiver and the BT receiver. WLAN and BT transmissions in the ISM band tend to de-sense the LTE receiver in Band 40 and Band 7. A level of de-sensing that occurs may depend upon which channel in the ISM band is being used by the WLAN/BT transceiver and which portion of Band 40 is being used by the LTE transceiver.

For example, a higher frequency portion of LTE Band 40 that encompasses 2380-2400 MHz creates a desensitization of more than 16 dB in all WLAN ISM channels. This level of desensitization means that a WLAN receiver that could normally detect a −80 dB signal can only detect a −64 dB signal. Similarly, WLAN signals in channels 1-3 of the ISM band, which range from 2401-2428 MHz, cause significant desensitization (e.g. more than 13 dB) in an LTE receiver operating in any portion of Band 40. In addition, WLAN signals in any ISM channel cause more than 16 dB de-sensing in an LTE receiver operating in the higher frequency portion (e.g., 2380-2400 MHz) of Band 40. BT, which operates in the ISM band, causes de-sensing in the LTE receiver in a similar, but less pronounced, manner as the WLAN signals due to BT's lower signal power.

With reference to FIG. 1, one embodiment of a wireless communication device 100 is shown that provides wireless coexistence through antenna switching. The wireless communication device 100 includes a first transceiver 110 and a second transceiver 120. Both transceivers 110, 120 process signals that are transmitted or received on a pair of antennas 150A, 150B. The transceivers 110, 120 are in signal communication with an antenna switch 140 that is capable of connecting one or both of the transceivers to one or both of the pair of antennas 150A, 150B.

A coexistence arbiter logic 130 selects which transceiver(s) 110, 120 should be connected to the antennas based, at least in part on an operating mode of the transceivers. In one embodiment, if the coexistence arbiter logic 130 determines that only one of the transceivers is actively transmitting or receiving, the coexistence arbiter logic 130 causes an antenna switch 140 to connect both antennas 150A, 150B to the active transceiver. In this mode, a transmitter can provide improved transmit performance using high power transmission, beamforming, and/or multiple input multiple output (MIMO) transmission. When connected to the two antennas a receiver can provide improved receive performance using maximal ratio combining (MRC) or MIMO reception techniques.

In one embodiment, if the coexistence arbiter logic 130 determines that both transceivers 110, 120 are actively transmitting/receiving, the coexistence arbiter logic 130 selects from a spatial multiplexing mode or a time division multiplex mode. In spatial multiplexing mode, each transceiver is connected to one of the antennas. The antenna pair 150A, 150B uses spatial multiplexing hardware circuitry (not shown) that is capable of transmitting a signal from a single transceiver that has been divided into two data streams, with one stream being communicated by each antenna. Instead of spatially multiplexing data streams from the same transceiver's signal through the antennas, a data stream corresponding to a "whole" signal from each transceiver is spatially multiplexed through each antenna.

In time division multiplexing (TDM) mode, signals associated with the two transceivers are interleaved in the time domain and communicated using both antennas. The antenna pair 150A, 150B uses a TDM arbiter logic (see FIG. 2) to accomplish TDM communication of signals from the two transceivers 110, 120. In one embodiment, the wireless communication device 110 includes a third transceiver (not shown). The coexistence arbiter logic 130 selects among the three transceivers to determine which transceiver(s) are connected to the antenna pair 150A, 150B, and in which mode (e.g., spatial multiplexing, TDM).

Figure 2:
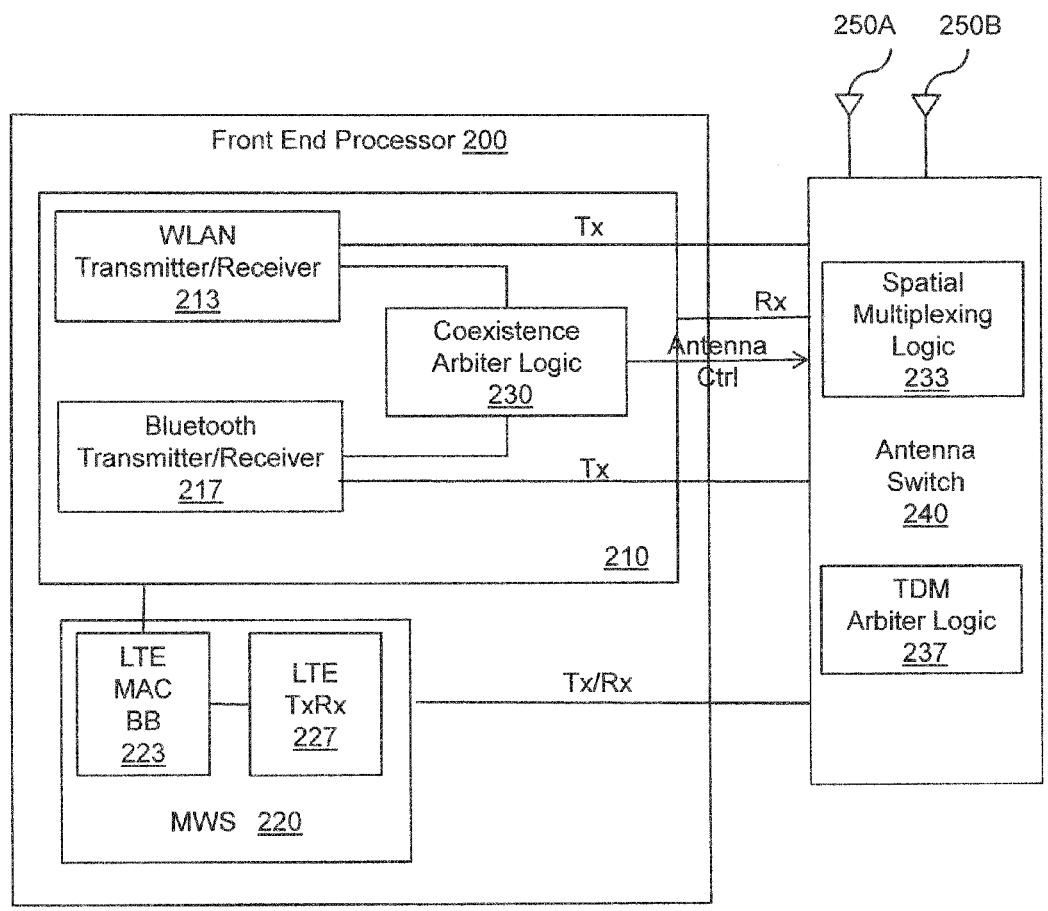
FIG. 2 illustrates one embodiment of an apparatus associated with wireless coexistence through antenna switching.

FIG. 2 illustrates one embodiment of a front end processor 200 that performs processing on signals flowing to and from a pair of antennas 250A, 250B. The front end processor 200 may be part of a mobile communications device. The front end processor includes a BT/WLAN chip 210 and a Mobile Wireless Standard (MWS) chip 220. The BT/WLAN chip 210 performs front end processing on signals in the ISM frequency band for a WLAN transceiver 213 and a Bluetooth (BT) transceiver 217. In the described embodiment, a coexistence arbiter logic 230 is implemented in hardware on the BT/WLAN chip 210. Arbitration rules used by the arbiter logic 230 are programmable via firmware on the BT/WLAN chip 210. The MWS chip 220 performs front end processing for LTE signals in Band 7 and Band 40. The MWS chip 220 includes a baseband processor 223 and an LTE transceiver 227.

The coexistence arbiter logic 230 determines a present operating mode of the WLAN transceiver 213, the BT transceiver 217, and the LTE transceiver 227. Operating mode information for the LTE transceiver 227 is obtained from the LTE baseband processor 223. The coexistence arbiter logic 230 produces an antenna control signal that specifies which transceiver(s) should be connected to one or both antennas 250A, 250B. Coexistence arbitration rules are programmed in the firmware with the coexistence arbiter logic 230. FIG. 4 illustrates one embodiment of arbitration rules that can be used by the coexistence arbiter logic 230 to produce an antenna control signal based on operating modes of the transceivers.

In one embodiment, four connections can be made by an antenna switch 240 to the pair of antennas 250A, 250B. The antenna switch can connect to the antennas one or two lines selected from: a transmit line from the WLAN transceiver 213, a receive line for the WLAN chip 210, a transmit line from the BT transceiver 217, and a transmit/receive line from the MWS chip 220. A spatial multiplexing logic 233 is configured to perform spatial multiplexing on signals from two transceivers such that one antenna communicates signals for each transceiver. A TDM arbiter logic 235 is configured to perform TDM processing on signals associated with two transceiver (e.g., interleaving signals from the two transceivers in the time domain) for communication on both antennas.

The front end processor 200 and antenna switch 240 illustrated in FIG. 2 allow LTE, WLAN, and BT transceivers to share the same antennas. WLAN and LTE communications can occur on both antennas using TDM. LTE and WLAN or BT signals can be simultaneously received. Because the antenna switch 240 connects only active transceivers to the antennas, de-sensing is greatly reduced.

Figure 3:
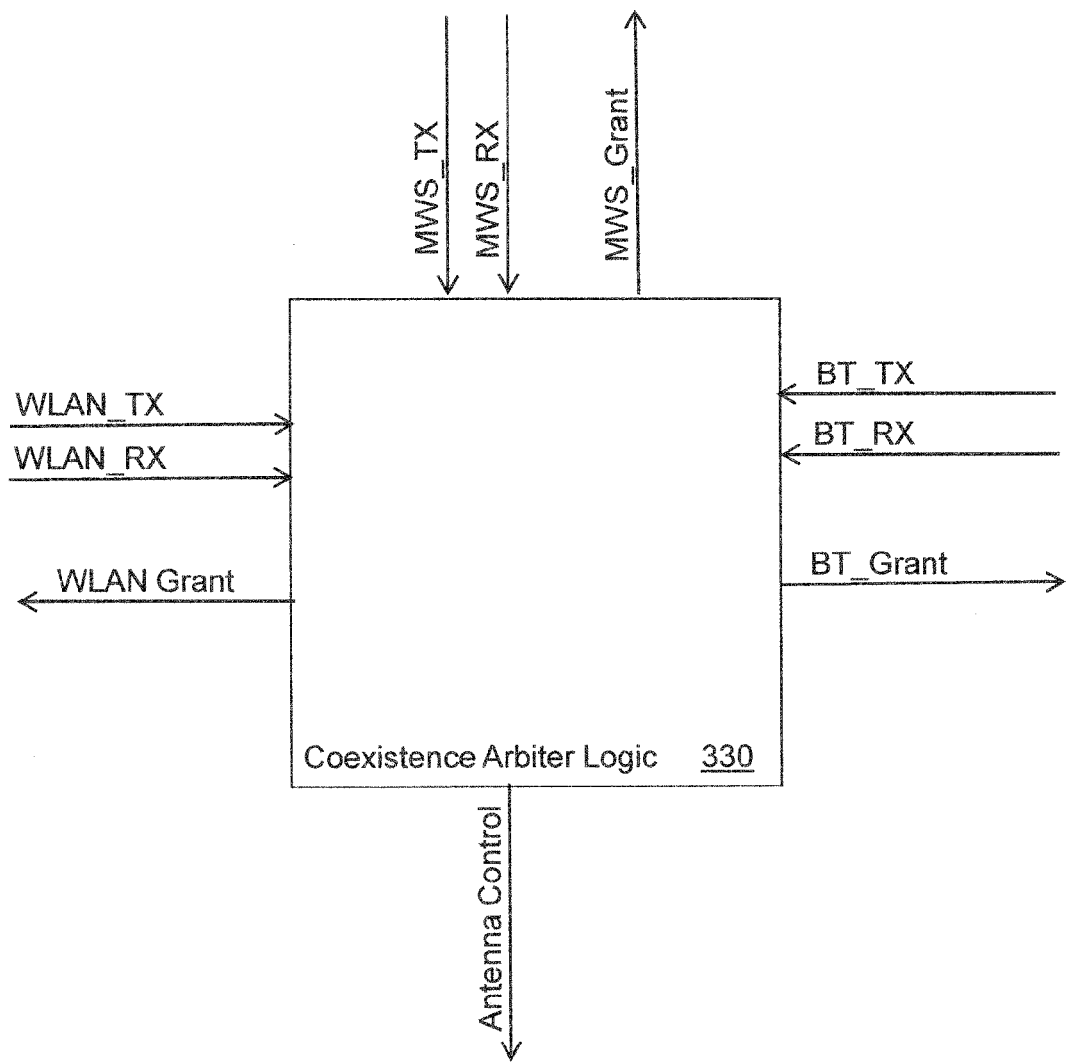
FIG. 3 illustrates one embodiment of an apparatus associated with wireless coexistence through antenna switching.

FIG. 3 illustrates one embodiment of a coexistence arbiter logic 330. The coexistence arbiter logic 330 inputs a transmit and receive signal from each of the transceivers (e.g., WLAN, BT, LTE). Based on input signals, the coexistence arbiter logic 330 selects one or two transceivers for connection to the antenna(s). The coexistence arbiter logic 330 provides a grant signal to the selected transceiver(s) and an antenna control signal to the antenna switch to connect the selected transceiver(s).

FIG. 4 is a matrix that illustrates a set of arbitration rules that can be used to selectively connect transceivers to two antennas. In the matrix, the quantities shown in parentheses correspond to (the number of antennas connected to the row device, the number of antennas connected to the column device). Each device can be in a transmit mode, a receive mode, and an idle mode. When a device is in idle mode, access to the antennas is not granted. WLAN can also operate in Rx-Idle in which the WLAN transceiver is sensing the channel.

When only LTE, or WLAN, or BT are transmitting or receiving, the active transceiver is connected to both antennas and MIMO or beamforming (Tx) or MRC (Rx) is used. This improves transmit and receive power. When both WLAN and LTE, or both LTE and BT, or both WLAN and BT are transmitting, each transmitting transceiver is connected to one antenna and spatial multiplexing is used. When LTE is transmitting and WLAN or BT is receiving (or Rx-IDLE for WLAN), each active transceiver is connected to one antenna and spatial multiplexing is used. When WLAN or BT is transmitting and LTE is receiving, each active transceiver is connected to one antenna and spatial multiplexing is used.

TDM (denoted as (2,2)) or spatial multiplexing (denoted as (1,1)) may be employed when two of the three transceivers are both receiving (or Rx-IDLE state for WLAN). Arbitration rules may specify TDM when the frequency bands used by the two transceivers are close enough to cause interference with one another if spatial multiplexing were utilized. For example, if the WLAN is using a channel in the range of channels 1-3, TDM may be selected. Or if the LTE transceiver is using the upper portion of Band 40 or the lower portion of Band 7, TDM may be selected.

When TDM is selected, either the LTE transceiver or the WLAN/BT transceiver may be in power save mode or not granted access to the antennas when the other transceiver is receiving. If all three transceivers are transmitting/receiving, the LTE transceiver is connected to one antenna and the WLAN and BT transceivers can be connected to the other antenna. TDM may be used to communicate both WLAN and BT signals on the same antenna.

Figure 5:
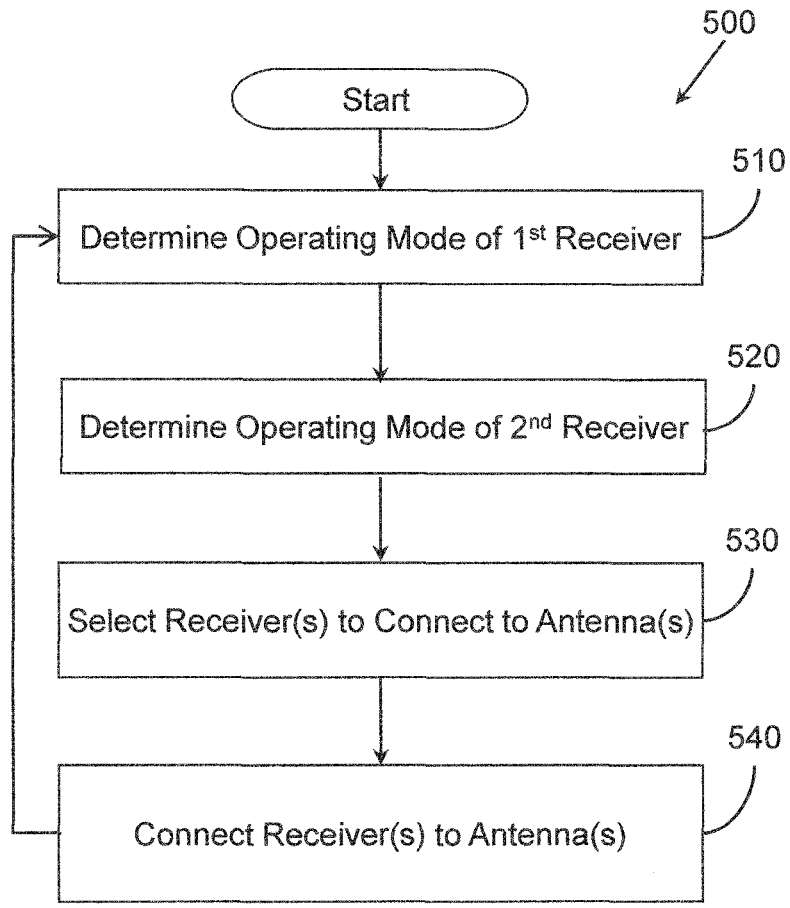
FIG. 5 illustrates one embodiment of a method associated with wireless coexistence through antenna switching.

FIG. 5 illustrates one embodiment of a method associated with wireless coexistence through antenna sharing. The method includes, at 510, determining a present operating mode of a first transceiver configured to communicate in a first frequency band on an antenna. The method includes, at 520, determining a present operating mode of a second transceiver configured to communicate in a second frequency band on the antenna. At 530, the method includes selecting one of the first and second transceivers for connection to the antenna, based, at least in part, on the operating mode of the first and second transceivers. At 540, the method includes connecting the selected transceiver to the antenna, such that the connected transceiver is enabled to communicate on the antenna and a transceiver not connected to the antenna is not able to communicate on the antenna.

In one embodiment two antennas are used to transmit and receive. In this embodiment, the method includes selecting the first transceiver for connection to both antennas when the first transceiver is transmitting or receiving and the second transceiver is not transmitting or receiving. The second transceiver is selected for connection to both antennas when the second transceiver is transmitting or receiving. When both the first and second transmitter are transmitting or receiving, the method includes selecting the first transceiver for connection to a first antenna and selecting the second transceiver for connection to a second antenna, such that the two antennas perform spatial multiplexing on the signals associated with the first and second transceivers.

In one embodiment, the method includes selecting both the first transceiver and the second transceiver when both the first transceiver and the second transceiver are transmitting or receiving. Signals associated with the first transceiver and the second transceiver are interleaved in the time domain for communication on both antennas when both the first transceiver and the second transceiver are selected.

In one embodiment, the method includes selecting between a spatial multiplexing mode and a TDM mode when the first transceiver and the second transceiver are transmitting or receiving. In spatial multiplexing mode, the first transceiver is connected to a first antenna and the second transceiver is connected to a second antenna. In TDM mode signals associated with the first transceiver and the second transceiver are interleaved in the time domain for communication on both antennas.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    two antennas;
    a first transceiver configured to communicate, on either one or two of the antennas, signals in a first frequency band;
    a second transceiver configured to communicate, on either one or two of the antennas, signals in a second frequency band;
    a coexistence arbiter logic configured to select the first transceiver and the second transceiver for connection to neither, one, or both of the two antennas, based, at least in part, on an operating mode of the first transceiver and the second transceiver; and
    an antenna switch configured to, based, at least in part, on the selection of the coexistence arbiter logic, connect each of the first transceiver and the second transceiver to neither, one, or both of the two antennas, such that:
        i) a transceiver that is connected by the switch to an antenna is enabled to communicate on the antenna, and
        ii) a transceiver that is not connected by the switch to an antenna is not able to communicate on the antenna;
    wherein the coexistence arbiter logic is configured to:
        i) select the first transceiver for connection to both antennas when the first transceiver is transmitting or receiving and the second transceiver is not transmitting or receiving; and
        ii) select the second transceiver for connection to both antennas when the second transceiver is transmitting or receiving and the first transceiver is not transmitting or receiving; and
        iii) when both the first transceiver and the second transceiver are transmitting or receiving, select the first transceiver for connection only to a first antenna and select the second transceiver for connection only to a second antenna, such that the two antennas perform spatial multiplexing on the signals associated with the first transceiver and the second transceiver.

2. The apparatus of claim 1, wherein the first transceiver is configured to process signals in one of i) an LTE frequency Band 40, ii) LTE frequency Band 7, iii) WLAN ISM frequency band, or iv) BT ISM frequency band, and the second transceiver is configured to process signals in a different one of v) an LTE frequency Band 40, vi) LTE frequency Band 7, vii) WLAN ISM frequency band, or viii) BT ISM frequency band.

3. The apparatus of claim 1, further comprising a time division multiplexing (TDM) arbiter logic configured to interleave signals associated with the first transceiver and the second transceiver in the time domain for communication on both antennas when both the first transceiver and the second transceiver are selected.

4. The apparatus of claim 3, wherein the first frequency band, comprises a BT frequency band and the second frequency band comprises a WLAN frequency band.

5. The apparatus of claim 3, wherein the first frequency band, comprises a BT or WLAN frequency band and the second frequency band comprises an LTE frequency band.

6. The apparatus of claim 3 wherein the TDM arbiter logic is configured to, when the first transceiver is transmitting, place the second transceiver in an operating mode in which access to the antennas is not granted.

7. The apparatus of claim 3, wherein:
    when both the first transceiver and the second transceiver are transmitting or receiving, the coexistence arbiter logic is configured to:
        i) when a difference between the first frequency band and the second frequency band is within a threshold difference, select both the first and second transceivers for connection to both the first and second antennas, and
        ii) when a difference between the first frequency band and the second transceiver for connection to the first antenna and the second transceiver for connection to the second antenna,
    such that the two antennas perform spatial multiplexing on the signals associated with the first and second transceivers.

8. A method, comprising:
    determining a present operating mode of a first transceiver configured to communicate in a first frequency band on one or both of a first antenna and a second antenna;
    determining a present operating mode of a second transceiver configured to communicate in a second frequency band on the one or both of the first antenna and the second antenna;
    when the first transceiver is transmitting or receiving and the second transceiver is not transmitting or receiving, selecting the first transceiver for connection to both antennas;
    when the second transceiver is transmitting or receiving and the first transceiver is not transmitting or receiving, selecting the second transceiver for connection to both antennas; and
    when both the first transceiver and the second transceiver are transmitting or receiving, selecting
        i) the first transceiver for connection to the first antenna; and
        ii) the second transceiver for connection to the second antenna; and
    connecting the selected transceiver to the selected one or both of the first antenna and the second antenna, such that the selected transceiver is enabled to communicate on an antenna to which the transceiver is connected and the selected transceiver is not able to communicate on an antenna to which the transceiver is not connected;

such that the two antennas perform spatial multiplexing on the signals associated with the first and second transceivers.

9. The method of claim 8, further comprising, when both the first transceiver and the second transceiver are transmitting or receiving, interleaving signals associated with the first transceiver and the second transceiver in the time domain for communication on both antennas.

10. The method of claim 9, further comprising placing the second transceiver in an operating mode in which access to the antennas is not granted when the first transceiver is transmitting.

11. The method of claim 9, wherein:
when both the first transceiver and the second transceiver are transmitting or receiving:
when a difference between the first frequency band and the second band is within a threshold difference, selecting both the first transceiver and the second transceiver for connection to both the first antenna and the second antenna; and
when a difference between the first frequency band and the second band is greater than the threshold difference,
i) selecting the first transceiver for connection to the first antenna and
ii) selecting the second transceiver for connection to the second antenna,
such that the two antennas perform spatial multiplexing on the signals associated with the first and second transceivers.

12. A device comprising:
a mobile wireless standard (MWS) transceiver configured to transmit and receive radio signals in an LTE frequency band;
a WLAN transceiver configured to transmit and receive radio signals in an ISM frequency band;
two antennas configured to communicate radio signals in a frequency band that includes the LTE frequency band and the WLAN frequency band;
a coexistence arbiter logic configured to select the MWS transceiver, the WLAN transceiver, or both for connection one or two of the two antennas, based, at least in part on arbitration rules;
an antenna switch configured to connect the MWS transceiver or the WLAN transceiver as selected by the coexistence arbiter logic to a selected one or two of the two antennas; such that:
i) a transceiver that is connected by the switch to an antenna is enabled to communicate on the antenna, and
ii) a transceiver that is not connected by the switch to an antenna is not able to communicate on the antenna;
wherein the coexistence arbiter logic is configured to:
i) select the MWS transceiver for connection to both antennas when the MWS transceiver is transmitting or receiving and the WLAN transceiver is not transmitting or receiving; and
ii) select the WLAN transceiver for connection to both antennas when the WLAN transceiver is transmitting or receiving and the MWS transceiver is not transmitting or receiving; and
iii) when both the MWS transceiver and the WLAN transceiver are transmitting or receiving, select the MWS transceiver for connection only to a first antenna and select the WLAN transceiver for connection only to a second antenna, such that the MWS antenna and the WLAN antenna perform spatial multiplexing on the signals associated with the MWS transceiver and the WLAN transceiver.

13. The device of claim 12, wherein the coexistence arbiter logic is implemented in hardware associated with the WLAN transceiver and the arbitration rules are programmable in firmware associated with the WLAN transceiver.

14. The device of claim 12, further comprising:
a BT transceiver configured to transmit and receive radio signals in the ISM frequency band, and
further wherein the coexistence arbiter logic is configured to select the MWS transceiver, the WLAN transceiver, the BT transceiver, or two of the three transceivers for connection to the one or more antennas, based, at least in part on the arbitration rules.

15. The device of claim 12 wherein the coexistence arbiter logic receives transmit and receive signals from the MWS transceiver and the WLAN transceiver, and further wherein the arbitration rules select the MWS transceiver, the WLAN transceiver, or both based on combinations of the transmit and receive signals.

16. The device of claim 12, further comprising a TDM arbiter logic configured to interleave signals of the WLAN transceiver and the MWS transceiver in the time domain for communication on two antennas when the coexistence arbiter logic selects both the WLAN and the MWS transceiver for connection to the two or more antennas.

* * * * *